(12) United States Patent
Liu

(10) Patent No.: US 11,241,092 B1
(45) Date of Patent: Feb. 8, 2022

(54) MODULAR POST ASSEMBLY FOR A SHELF STORAGE RACK

(71) Applicant: TAIWAN SHIN YEH ENTERPRISE CO., LTD., Chiayi Hsien (TW)

(72) Inventor: Hung-Tsun Liu, Chiayi (TW)

(73) Assignee: Taiwan Shin Yeh Enterprise Co., Ltd., Chiayi Hsien (TW)

( * ) Notice: Subject to any disclaimer, the term of this patent is extended or adjusted under 35 U.S.C. 154(b) by 0 days.

(21) Appl. No.: 17/015,749

(22) Filed: Sep. 9, 2020

(51) Int. Cl.
*A47B 96/14* (2006.01)
*A47B 57/34* (2006.01)
*A47B 47/00* (2006.01)
*A47B 87/02* (2006.01)
*F16B 7/00* (2006.01)

(52) U.S. Cl.
CPC ...... *A47B 96/1458* (2013.01); *A47B 47/0083* (2013.01); *A47B 57/34* (2013.01); *A47B 87/0215* (2013.01); *A47B 87/0223* (2013.01); *A47B 96/1475* (2013.01); *F16B 7/00* (2013.01)

(58) Field of Classification Search
CPC . A47B 96/1458; A47B 57/34; A47B 96/1475; A47B 96/14; A47B 96/145; A47B 47/00; A47B 47/0083; A47B 47/0091; A47B 47/02; A47B 47/021; A47B 47/027; A47B 87/00; A47B 87/005; A47B 87/02; A47B 87/0207; A47B 87/0215; A47B 87/0223; A47B 87/0276; Y10T 403/55; F16B 7/00; F16B 12/28; F16B 12/36; F16B 2012/403
USPC .................................. 211/187, 188, 194, 191
See application file for complete search history.

(56) References Cited

U.S. PATENT DOCUMENTS

| | | | | |
|---|---|---|---|---|
| 2,226,763 A | * | 12/1940 | Geib | A63H 33/06 446/116 |
| 2,236,045 A | * | 3/1941 | Vanderveld | A47B 96/1458 248/243 |
| 2,748,954 A | * | 6/1956 | Murrenjohn | A47B 87/02 108/91 |
| 3,056,507 A | * | 10/1962 | Squires, Jr. | A47B 57/18 108/106 |
| 3,499,398 A | * | 3/1970 | Murray | B65D 19/385 108/53.5 |
| 3,804,033 A | * | 4/1974 | Izawa | B65D 19/385 108/53.5 |
| 3,946,876 A | * | 3/1976 | Jay | B65D 19/08 211/60.1 |
| 3,985,461 A | * | 10/1976 | Gebhard | F16B 12/36 403/292 |

(Continued)

*Primary Examiner* — Jennifer E. Novosad
(74) *Attorney, Agent, or Firm* — Muncy, Geissler, Olds & Lowe, P.C.

(57) ABSTRACT

An angle bar includes two longitudinal angled plate portions, and a corner portion connecting therebetween. The corner portion has an inner corner surface bounding an inner corner space and an outer corner surface. A stopper protrudes into the indented corner space, and has an abutment face extending across the indented corner space. A limiter protrudes into the indented corner space from the inner corner surface, and has a through hole opening in a direction along a bending line of the corner portion. A modular post assembly has at least two angle bars abutting each other, and a fixing rod extending through the through holes of the bars along the bending line and limited between the stoppers for fixing together the bars.

8 Claims, 8 Drawing Sheets

(56) References Cited

U.S. PATENT DOCUMENTS

| | | | | |
|---|---|---|---|---|
| 4,102,276 A * | 7/1978 | Roveroni | | A47F 5/116 |
| | | | | 108/156 |
| 4,141,665 A * | 2/1979 | Snapp, Jr. | | F16C 11/10 |
| | | | | 297/378.12 |
| 4,645,276 A * | 2/1987 | Flavigny | | A47B 57/44 |
| | | | | 108/107 |
| 4,896,992 A * | 1/1990 | Muhlethaler | | F16B 7/00 |
| | | | | 211/182 |
| 5,348,170 A * | 9/1994 | Thornley | | A47B 57/20 |
| | | | | 108/107 |
| 5,553,549 A * | 9/1996 | Nilsson | | A47B 9/00 |
| | | | | 100/144 |
| 5,611,634 A * | 3/1997 | Wang | | A47D 13/063 |
| | | | | 403/102 |
| 5,685,660 A * | 11/1997 | Liao | | E05D 11/1007 |
| | | | | 384/585 |
| 5,788,347 A * | 8/1998 | Rabinovitz | | A47B 87/0215 |
| | | | | 312/111 |
| 5,988,928 A * | 11/1999 | Cheng | | A47D 13/063 |
| | | | | 16/324 |
| 6,216,894 B1 * | 4/2001 | Hendricks | | A47B 63/00 |
| | | | | 211/194 |
| 6,527,473 B2 * | 3/2003 | Chen | | A47B 87/0207 |
| | | | | 211/182 |
| 7,204,377 B2 * | 4/2007 | Marion | | F16B 7/0426 |
| | | | | 211/183 |
| 7,255,237 B2 * | 8/2007 | Stitchick | | A47B 47/022 |
| | | | | 211/106 |
| 7,784,613 B2 * | 8/2010 | Angeletti | | B65G 49/062 |
| | | | | 206/448 |
| 7,967,157 B2 * | 6/2011 | Bilotto | | A47F 5/16 |
| | | | | 211/194 |
| 8,967,401 B2 * | 3/2015 | Wu | | A47B 91/024 |
| | | | | 211/191 |
| 9,723,925 B1 * | 8/2017 | Tsai | | A47B 47/00 |
| 10,299,588 B1 * | 5/2019 | Lai | | A47B 87/0223 |
| 10,321,761 B1 * | 6/2019 | Lai | | A47B 96/1466 |
| 10,626,905 B1 * | 4/2020 | Chiu | | A47B 57/545 |
| 11,064,806 B1 * | 7/2021 | Ge | | A47B 47/0083 |
| 11,083,289 B2 * | 8/2021 | Nemeth | | F16B 12/40 |
| 2006/0086684 A1 * | 4/2006 | Wu | | A47B 96/145 |
| | | | | 211/192 |
| 2011/0272541 A1 * | 11/2011 | Wojtowicz | | A47B 87/0215 |
| | | | | 248/218.4 |
| 2011/0272542 A1 * | 11/2011 | Wojtowicz | | A47F 5/14 |
| | | | | 248/218.4 |
| 2012/0125870 A1 * | 5/2012 | Decroos | | F16B 7/0406 |
| | | | | 211/26 |
| 2012/0285917 A1 * | 11/2012 | O'Quinn | | A47F 5/103 |
| | | | | 211/182 |
| 2015/0257530 A1 * | 9/2015 | Naka | | A47B 47/0091 |
| | | | | 211/188 |
| 2016/0198848 A1 * | 7/2016 | Mogensen | | A47B 96/068 |
| | | | | 211/187 |
| 2017/0211604 A1 * | 7/2017 | Tsai | | A47B 47/0083 |
| 2019/0059588 A1 * | 2/2019 | Liss | | A47B 96/1408 |
| 2019/0142175 A1 * | 5/2019 | Cantrell | | F16B 12/32 |
| | | | | 5/9.1 |

* cited by examiner

MODULAR POST ASSEMBLY FOR A SHELF STORAGE RACK

FIELD

The disclosure relates to a modular post assembly, and more particularly to a modular post assembly for a shelf storage rack.

BACKGROUND

A separable type shelf storage rack may be disassembled and reassembled, and is adjustable in size to suit different installation spaces. An existing modular post assembly for the shelf storage rack includes a plurality of posts, a plurality of connectors for connecting the posts, and a plurality of fasteners for fixing the posts and the connectors.

Traditionally, the connectors are metal plates, and the fasteners are screws. To assemble the modular post assembly, the connectors are arranged to straddle adjacent posts and are then secured to the posts by the fasteners. Therefore, the task of assembling the post assembly consumes time and requires a suitable tool. Further, because the connectors protrude outwardly at the joints of the posts, unpleasant unevenness is created in the outer appearance of the modular post assembly.

SUMMARY

Therefore, one object of the disclosure is to provide a modular post assembly for a shelf storage rack that can alleviate at least one of the drawbacks of the prior art.

Accordingly, a modular post assembly of the disclosure includes at least two bars and at least one fixing rod.

The at least two bars are aligned along a longitudinal direction of the modular post assembly and abut against each other. Each of the at least two bars has two longitudinally opposite ends, at least one stopper disposed proximately to at least one of the ends, and at least one limiter that is disposed between the at least one of the ends and the at least one stopper and that has a through hole.

The at least one fixing rod detachably fixes together the at least two bars. The at least one fixing rod straddles the at least two bars, threads through the through holes of the at least two bars and is limited between the at least one stoppers of the at least two bars.

Another object of the disclosure is to provide an angle bar for the modular post assembly.

According to another object of the disclosure, an angle bar includes two longitudinal plate portions, a corner portion, at least one stopper, and at least one limiter.

The two longitudinal plate portions are angled to each other.

The corner portion connects between the two longitudinal plate portions. The corner portion has an inner corner surface that bounds an indented corner space, and an outer corner surface opposite to the inner corner surface.

The at least one stopper protrudes into the indented corner space from the inner corner surface, and has an abutment face extending across the indented corner space.

The least one limiter protrudes into the indented corner space from the inner corner surface, and has a through hole opening in a direction along a bending line of the corner portion.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
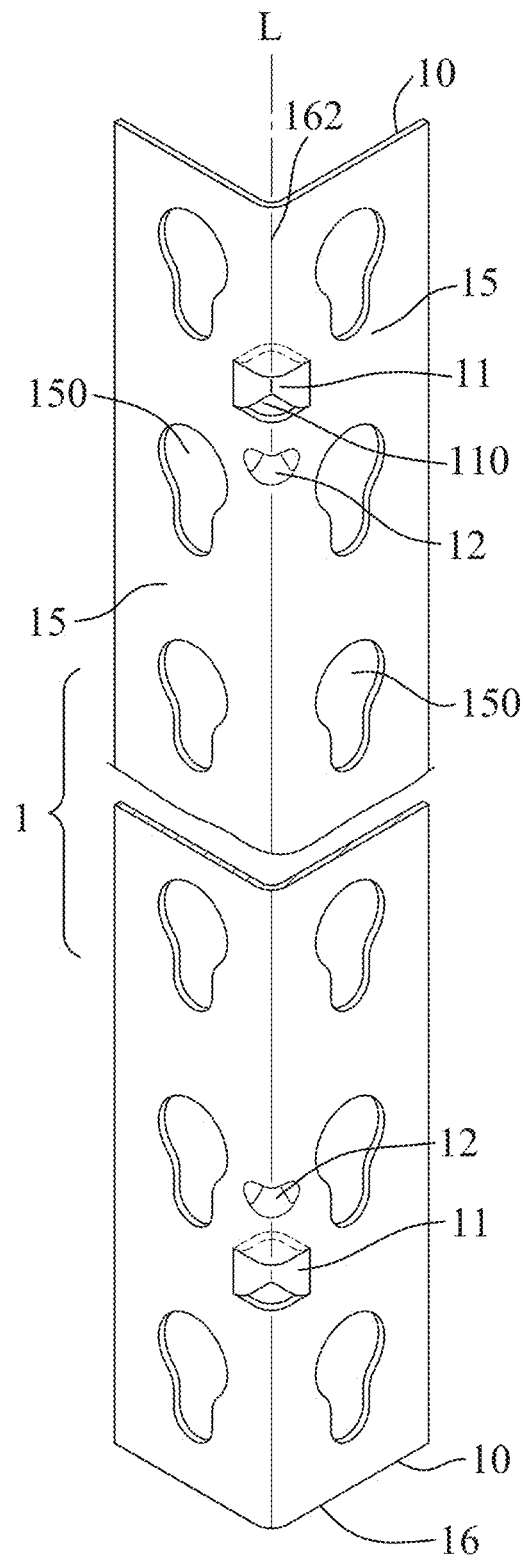
FIG. 1 is a perspective view illustrating a bar of a modular post assembly according to a first embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
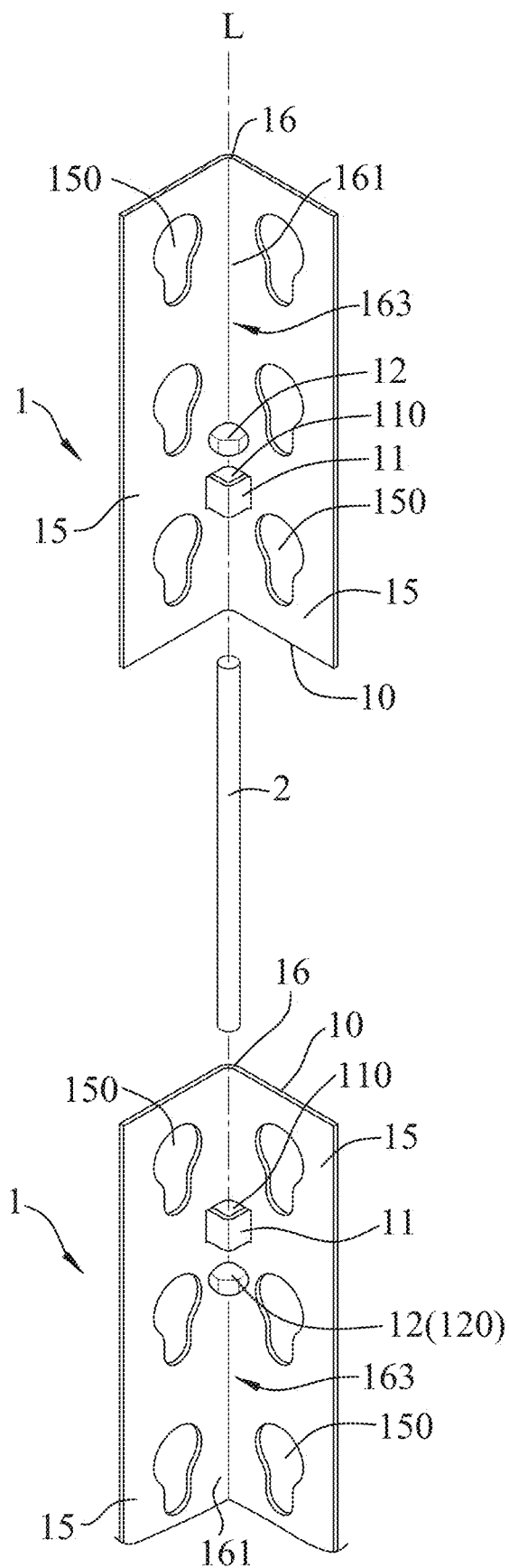
FIG. 3 is a perspective view similar to FIG. 2, but viewed from a reverse side.
Figure 4:
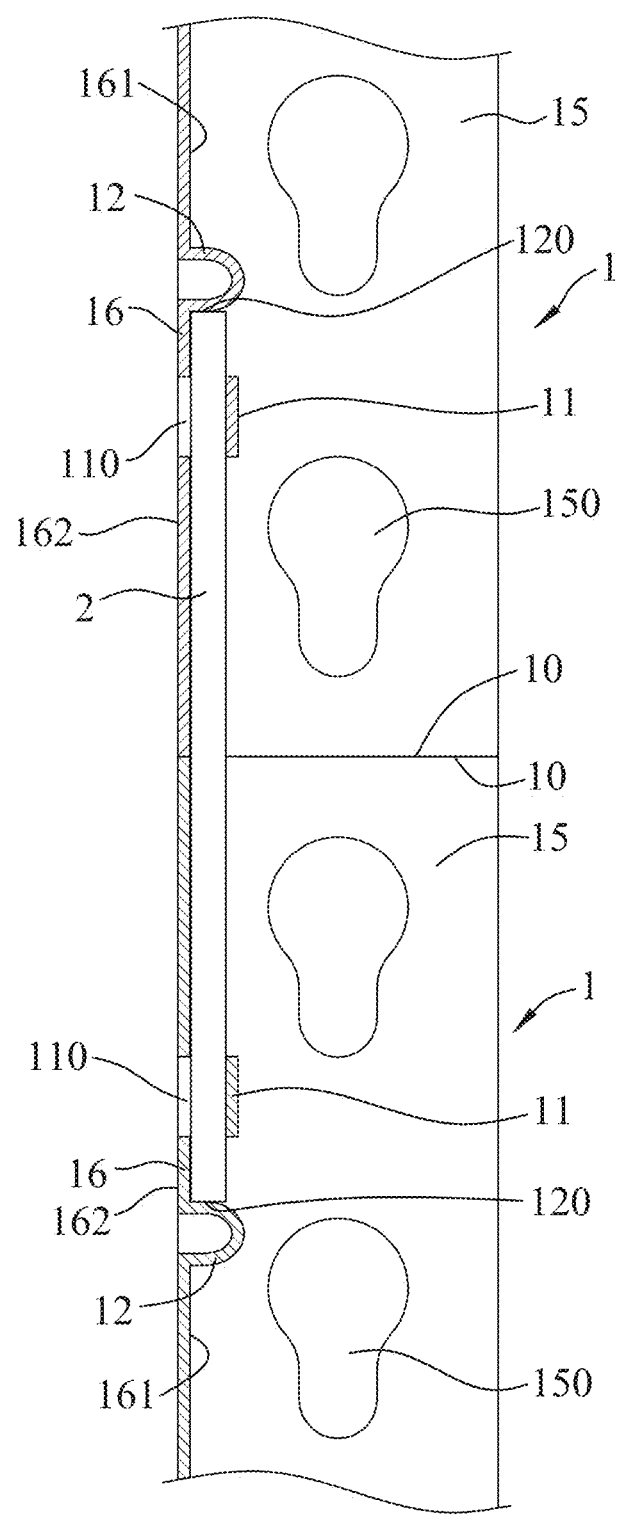
FIG. 4 is a fragmentary sectional view of the first embodiment illustrating the fixing rod fixing together two bars abutting against each other.
Figure 5:
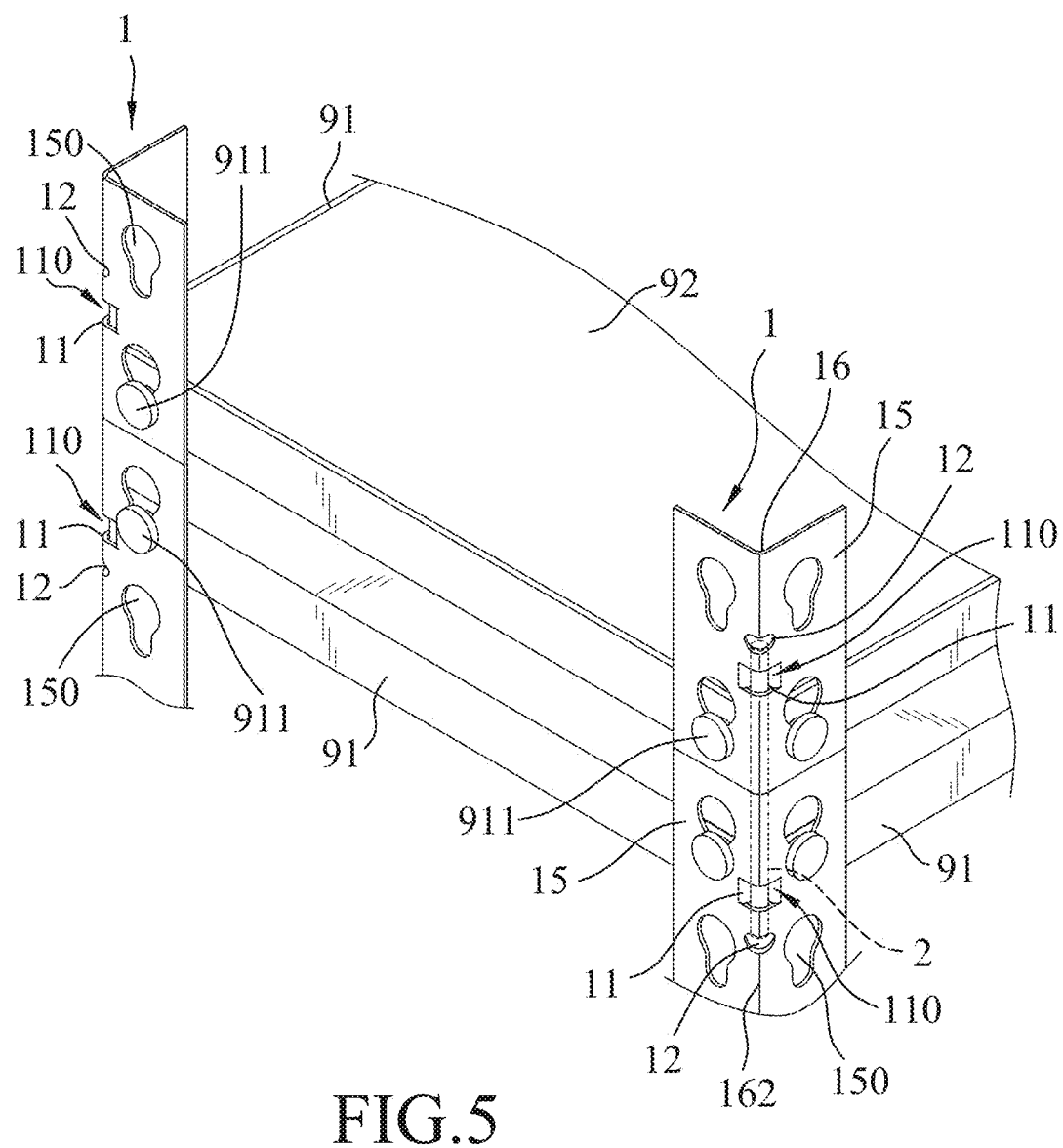
FIG. 5 is a fragmentary perspective view of the first embodiment illustrating the modular post assemblies and shelves.

FIGS. 1 to 5 illustrate a modular post assembly for a shelf storage rack according to a first embodiment of the disclosure. The shelf storage rack includes a plurality of spaced apart shelves (only two are shown in FIG. 5), each of which is composed of four transverse bar 91 (only two are shown for each shelf), and a shelf plate 92 supported on four transverse bar 91. The shelf storage rack further includes a plurality of retaining elements 911.

The modular post assembly of the disclosure includes a plurality of bars 1 (only two are shown in FIGS. 2 to 5) and a plurality of fixing rods 2 (only one is shown). The bars 1 are aligned along a longitudinal direction of the modular post assembly and abut against each other. The fixing rod 2 detachably connects the two bars 1 abutting against each other in an end-to-end manner.

As best shown in FIG. 1, each bar 1 has two longitudinally opposite ends 10, two longitudinal plate portions 15, a corner portion 16, two stoppers 12, and two limiters 11.

The longitudinal plate portions 15 are angled to each other. Each longitudinal plate portion 15 has a plurality of retaining holes 150 that are spaced apart from each other along the longitudinal direction of the modular post assembly for respectively receiving the retaining elements 911.

The corner portion 16 connects between the two longitudinal plate portions 15. The longitudinal plate portions 15 and the corner portion 16 cooperatively form an angle bar. In this embodiment, the corner portion 16 has an inner corner surface 161 that bounds an indented corner space 163, and an outer corner surface 162 opposite to the inner corner surface 162.

The stoppers 12 are located on the corner portion 16 and are respectively proximate to the two ends 10. Each stopper 12 protrudes into the indented corner space 163 from the inner corner surface 161, and has an abutment face 120 extending across the indented corner space 163. In this embodiment, each stopper 12 is a punched bulge formation that is indented from the outer corner surface 162, and that has the abutment face 120.

Each limiter 11 is located on the corner portion 16, is disposed between one of the two ends 10 and one of the stoppers 12, and has a through hole 110. Further, each limiter 11 protrudes into the indented corner space 163 from the inner corner surface 161. The through hole 110 opens in a direction along a bending line (L) of the corner portion 16. In this embodiment, each limiter 11 is a C-shaped ring that defines the through hole 110 and that is a punched piece indented from the outer corner surface 162 and partially cut apart from the corner portion 16.

Figure 2:
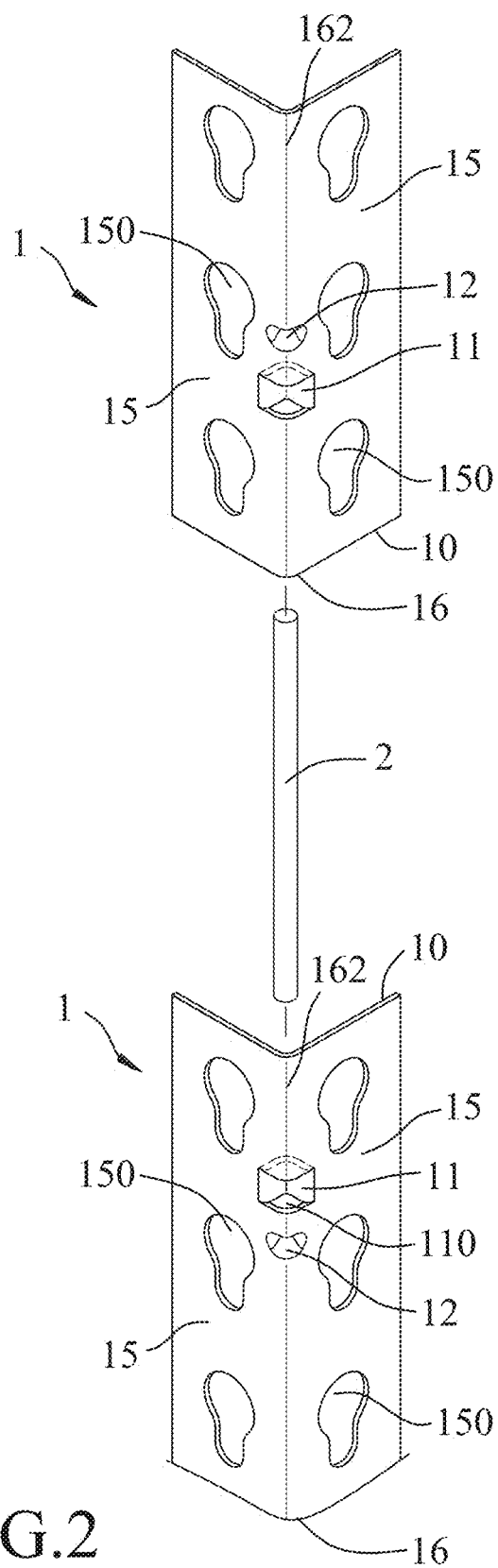
FIG. 2 is a perspective view of the first embodiment illustrating two bars aligned with each other to be assembled by a fixing rod.

As best shown in FIGS. 2 to 4, the lower end 10 of the upper bar 1 is in abutment with the upper end 10 of the lower bar 1. The fixing rod 2 straddles the two bars 1 and extends along the corner portions 16 thereof. The fixing rod 2 also threads through the through hole 110 of a lower one of the limiters 11 of the upper bar 1 and the through hole 110 of an upper one of the limiters 11 of the lower bar 1, and is limited between the stoppers 12 of the upper and lower bars 1. Particularly, the lower end of the fixing rod 2 is in abutment with the abutment face 120 of the upper one of the stoppers 12 of the lower bar 1, and the upper end of the fixing rod 2 is in abutment with the abutment face 120 of the lower one of the stoppers 12 of the upper bar 1. Therefore, each fixing rod 2 can prevent the limiters 11 of the two bars 1 from moving relative to each other in a horizontal direction. Accordingly, the two bars 1 abutting with each other can be fixed and prevented from separation by the fixing rod 2.

To assemble the modular post assembly, the fixing rod 2 is firstly caused to thread through the upper through hole 110 of the lower bar 1 until the abutment face 120 of the upper stopper 12 of the lower bar 1 abuts with the lower end of the fixing rod 2. Afterwards, the lower end 10 of the upper bar 1 is moved in a top-to-bottom direction toward the upper end 10 of the lower bar 1, and the upper end of the fixing rod 2 is caused to extend through the lower through hole 110 of the upper bar 1 and to abut the lower stopper 12 of the upper bar 1. By repeating the aforesaid assembling process, the length of the modular post assembly may be increased by using a second fixing rod 2 (not shown) to fix the upper end 10 (not shown) of the upper bar 1 to another upper bar 1 (not shown), and/or by using a third fixing rod 2 (not shown) to fix the lower end 10 (not shown) of the lower bar 1 to another lower bar 1 (not shown). To disassemble the modular post assembly of the disclosure, each of the bars 1 may be longitudinally moved away from each other and each fixing rod 2 may be detached from the two bars 1.

Referring back to FIG. 5, four modular post assemblies of the disclosure (only two are shown) are shown to be disposed at four corners of the shelf storage rack. Each of the transverse bars 91 is supported by the retaining elements 911 inserted into the retaining holes 150 of two bars 1. Each shelf plate 92 is supported by four transverse bars 91 (only two are shown for each shelf plate 92). Because the retaining elements 911 are adjustably inserted into the retaining holes 150 at a selected height of the bars 1, the shelf plates 92 can be positioned at selected heights relative to the bars 1. In this embodiment, each retaining element 911 is, but not limited to, a stud.

Figure 6:
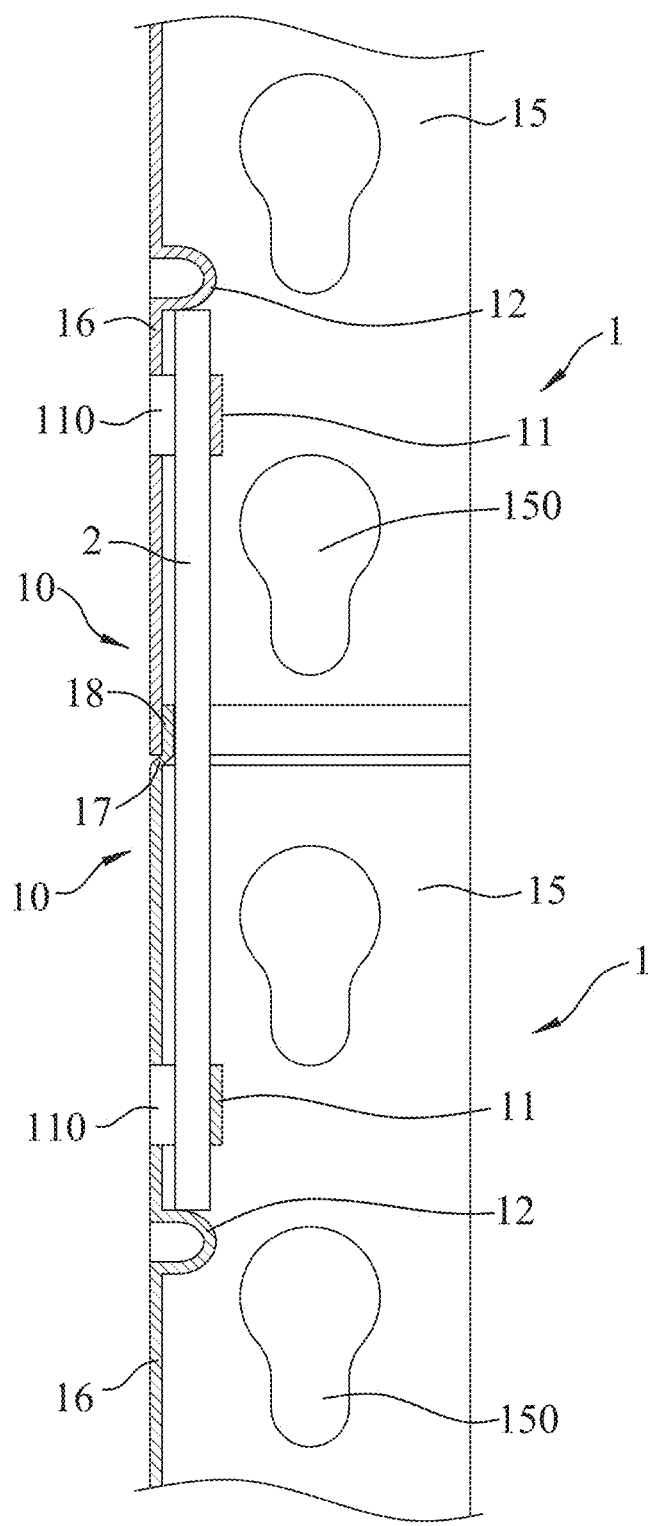
FIG. 6 is a fragmentary sectional view illustrating a post assembly according to a second embodiment of the disclosure.

FIG. 6 illustrates a modular post assembly of a second embodiment according to the disclosure, which has a structure similar to that of the first embodiment. However, in this embodiment, one of the ends 10 of each bar 1 is a punched end portion that has a constricted end 18 and a bent shoulder part connected to the constricted end 18. The other one of the ends 10 of each bar 1 is a non-punched end portion. The constricted end 18 is smaller in cross section than the non-punched end portion. The punched end portion of one of the two bars 1 abutting against the non-punched end portion of the other one of the two bars 1 in such a manner that an outer surface of the constricted end 18 is in abutment with an inner surface of the non-punched end portion and that the bent shoulder part 17 is in abutment with an end face of the non-punched end portion. Accordingly, firmness of the assembly of the two bars 1 is enhanced. Because the constricted end 18 and a bent shoulder part 17 of one of two bars 1 abut with the non-punched end portion of the other one of the two bars 1, the two bars are prevented from rotating relative to each other about the fixing rod 2.

Figure 7:
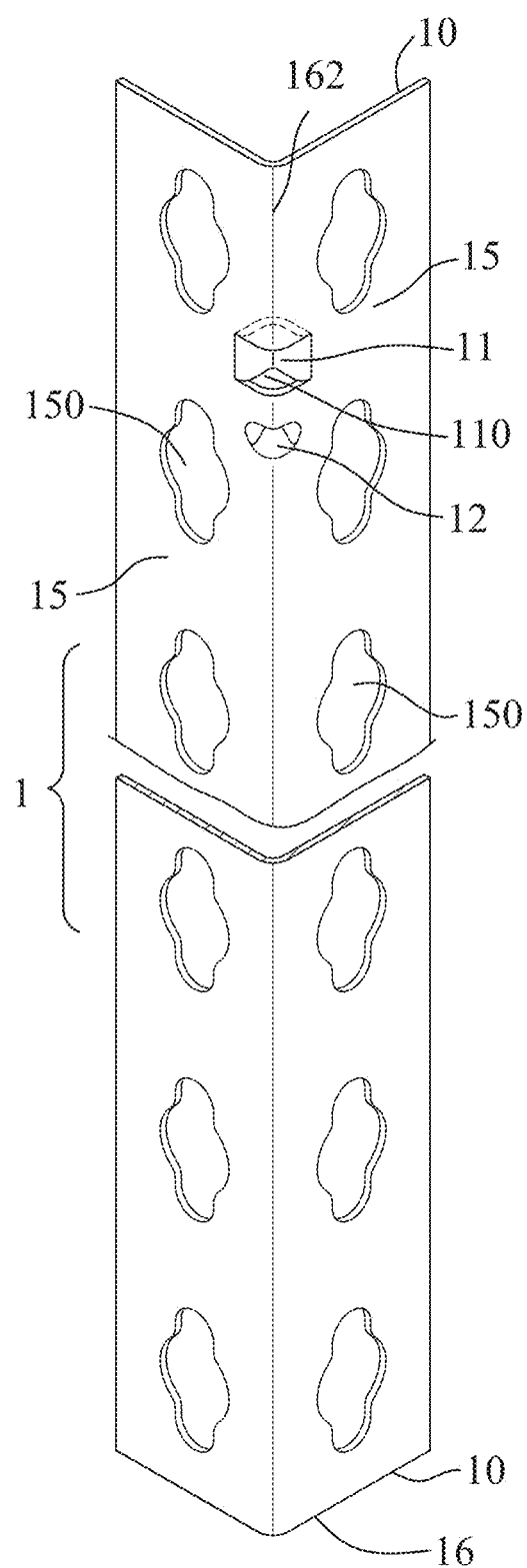
FIG. 7 is a perspective view illustrating a bar of a post assembly according to a third embodiment of the disclosure.
Figure 8:
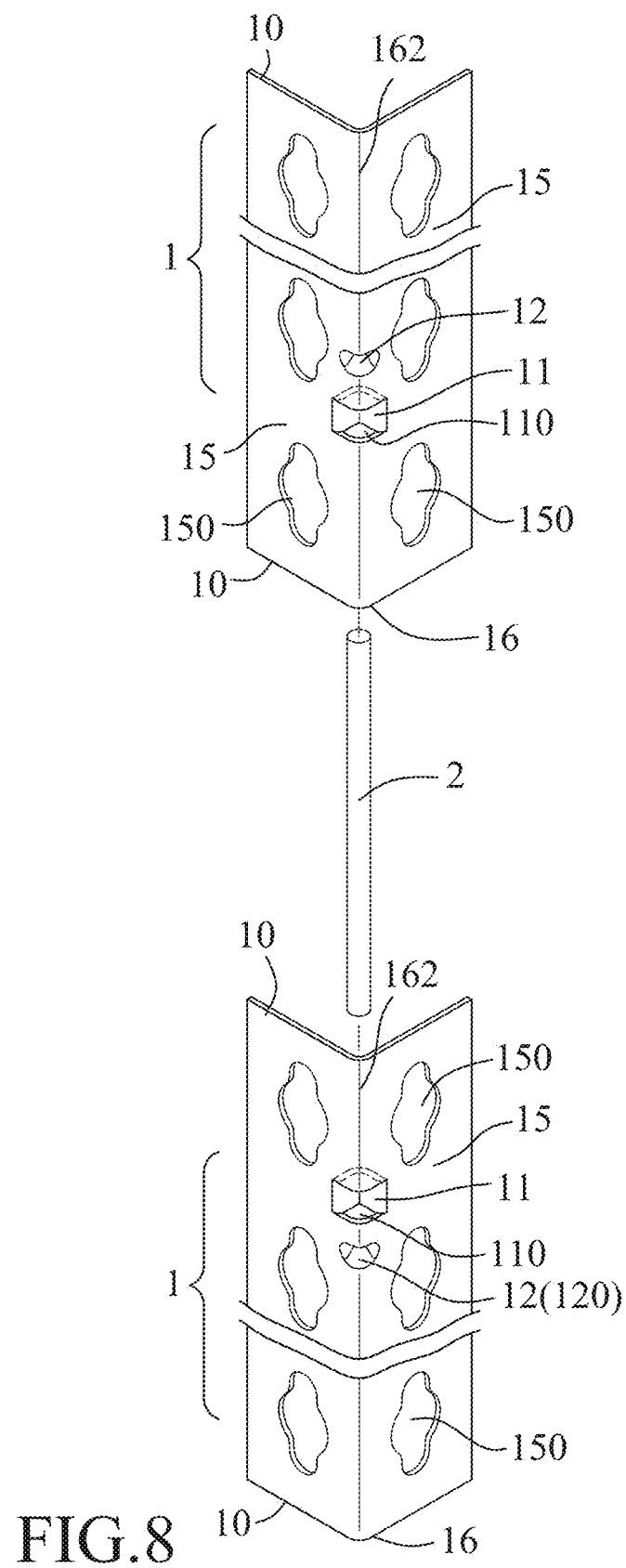
FIG. 8 is a perspective view of the third embodiment illustrating two bars aligned with each other to be assembled by a fixing rod.

FIGS. 7 and 8 illustrate a modular post assembly of a third embodiment according to the disclosure, which has a structure similar to that of the first embodiment. However, in this embodiment, each bar 1 has only one stopper 12 disposed proximally to one of the ends 10 thereof (hereinafter referred to as "a first end 10" for ease of explanation), and only one limiter 11 that is disposed between that the first end 10 and the stopper 12. The limiter 11 is a C-shaped ring defining the through hole 110.

Each of the retaining holes 150 has two small hole portions opposite to each other along the bending line (L) of the corner portion 16, and an enlarged hole portion connected between the two small hole portions. The enlarged hole portion is larger than each of the small hole portions.

To assemble two bars 1, one of the two bars 1 is inverted relative to the other bar 1 and longitudinally aligned with the other bar 1 in such a manner that the first ends 10 of the two bars 1 abut against each other and that the through holes 110 of the bars 1 are longitudinally aligned to face each other. The fixing rod 2 straddles the corner portions 16 of the two bars 1, threads through the through holes 110 of the two bars 1, and is limited between the stoppers 12 of the two bars 1 to detachably fix together the two bars 1.

To sum up, by virtue of the stoppers 12 and the limiters 11 provided on each bar 1 to connect the fixing rod 2, the modular post assembly can be provided with an even and neat appearance, and can be assembled with a minimum amount of components, thereby reducing the manufacture cost. Further, disassembly and reassembly of the post assembly can be done without using any tool and spending much time.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A modular post assembly for a shelf storage rack, comprising:
    at least two bars aligned along a longitudinal direction of the modular post assembly and abutting against each other, each of said at least two bars having two longitudinally opposite ends, at least one stopper disposed proximately to at least one of said ends, and at least one limiter that is disposed between said at least one of said ends and said at least one stopper and that has a through hole; and
    at least one fixing rod detachably fixing together said at least two bars, said at least one fixing rod straddling said at least two bars, threading through said through holes of said at least two bars and limited between said at least one stoppers of said at least two bars;
    wherein each of said at least two bars further has two longitudinal plate portions angled to each other, and a corner portion connecting between said two longitudinal plate portions, said longitudinal plate portions and said corner portion cooperatively forming an angle bar;
    wherein said corner portion has an inner corner surface that bounds an indented corner space, and an outer corner surface opposite to said inner surface;
    wherein said at least one stopper protrudes into said indented corner space from said inner corner surface, and having an abutment face extending across said indented corner space to abut with one end of said at least one fixing rod; and
    wherein said at least one limiter protrudes into said indented corner space from said inner corner surface, said through hole opening in a direction along a bending line of said corner portion.

2. The modular post assembly as claimed in claim 1, wherein said at least one fixing rod extends along said corner portions of said at least two bars.

3. The modular post assembly as claimed in claim 1, wherein:
    each of said longitudinal plate portions has a plurality of retaining holes that are spaced apart from each other along the longitudinal direction of the modular post assembly for respectively receiving retaining elements and that are used to support a plurality of shelf plates of the shelf storage rack.

4. The modular post assembly as claimed in claim 1, wherein:
    said at least one stopper includes two stoppers that are respectively proximate to said two ends; and
    said at least one limiter includes two limiters each of which is disposed between one of said two ends and one of said stoppers.

5. The modular post assembly as claimed in claim 4, wherein:
    said at least two bars includes more than two bars; and
    said at least one fixing rod includes a plurality of fixing rods each of which detachably connects two of said more than two bars.

6. The modular post assembly as claimed in claim 1, wherein said at least one limiter is a C-shaped ring that defines said through hole and that is a punched piece indented from said outer corner surface and partially cut apart from said corner portion.

7. The modular post assembly as claimed in claim 1, wherein said at least one stopper is a punched bulge formation indented from said outer corner surface and having said abutment face.

8. A modular post assembly for a shelf storage rack, comprising:
    at least two bars aligned along a longitudinal direction of the modular post assembly and abutting against each other, each of said at least two bars having two longitudinally opposite ends, at least one stopper disposed proximately to at least one of said ends, and at least one limiter that is disposed between said at least one of said ends and said at least one stopper and that has a through hole; and
    at least one fixing rod detachably fixing together said at least two bars, said at least one fixing rod straddling said at least two bars, threading through said through holes of said at least two bars and limited between said at least one stoppers of said at least two bars;
    wherein each of said at least two bars further has two longitudinal plate portions angled to each other, and a corner portion connecting between said two longitudinal plate portions, said longitudinal plate portions and said corner portion cooperatively forming an angle bar; and
    wherein one of said ends of each of said at least two bars is a punched end portion that has a constricted end and a bent shoulder part connected to said constricted end, the other one of said ends of each of said at least two bars being a non-punched end portion, said constricted end being smaller in cross section than said non-punched end portion, said punched end portion of one of said at least two bars abutting against said non-punched end portion of the other one of said at least two bars in such a manner that an outer surface of said constricted end is in abutment with an inner surface of said non-punched end portion and that said bent shoulder part is in abutment with an end face of said non-punched end portion.

\* \* \* \* \*